UNITED STATES PATENT OFFICE.

CHARLES H. KERR, OF TARENTUM, PENNSYLVANIA, ASSIGNOR TO PITTSBURGH PLATE GLASS COMPANY, OF PITTSBURGH, PENNSYLVANIA, A CORPORATION OF PENNSYLVANIA.

POT FOR THE MANUFACTURE OF PLATE-GLASS, AND THE METHOD OF MAKING THE SAME.

1,217,956.  Specification of Letters Patent.  Patented Mar. 6, 1917.

No Drawing. Application filed May 8, 1914, Serial No. 837,138. Renewed November 18, 1916. Serial No. 132,204.

*To all whom it may concern:*

Be it known that I, CHARLES H. KERR, a citizen of the United States, residing at Tarentum, in the county of Allegheny and State of Pennsylvania, have invented new and useful Improvements in Pots for the Manufacture of Plate-Glass, and the Methods of Making the Same, of which the following is a specification.

The invention relates to the making of the pots employed in the melting of glass batch for the making of plate glass, and has for its primary objects, the production of a pot of maximum durability, and one which will improve the quality of the glass by the elimination of the chief defects caused by the pot, which defects are known in the art as "string", "stone" and "ream".

Practically all of the glass pots as now made in this country are produced from clay found in the vicinity of St. Louis, Missouri, such clay being mixed with a relatively small quantity of clay imported from Germany. These clays may differ somewhat, even where produced from the same locality, but are characterized physically by their suitability for the purpose intended, and by the fact that they are low in sand content. Because of their universal use, these clays may be fairly designated as "ordinary pot clay", but it will be understood that where such term is used it is intended to designate either the ordinary domestic or foreign clays, or mixtures thereof such as are now employed in this country, or which might be employed because of their similar characteristics, for the making of pots for use in melting of glass batch.

Glass made in these pots of ordinary pot clay are subject to the defects known as "string", "stone" and "ream". "String", "stone" and "ream" may be due to causes other than the pot and it is to be understood that only such defects as ordinarily arise from the pot are here referred to. The "stone" is a piece of foreign and non-transparent material which shows up in the finished product, and which is due to the fact that in the melting operation a particle of the clay constituting the pot became detached from the pot but failed to go into complete solution in the glass. The defect known as "string" is similarly caused, the only difference being that the particle of clay is more completely dissolved, and instead of occurring as a distinct non-transparent particle it is changed to a transparent silicate which is visible because of its different index of refraction and which by partial mixing with the glass is seen as irregular strings or lines. "Ream", as caused by the pot, is similar to string but of much greater size and without clearly defined edges. It has hitherto been impossible to overcome these difficulties since the material of the pot would not be dissolved uniformly into the glass as the pot washed away and therefore the defects "stone", "string" and "ream" remained.

In overcoming the foregoing difficulties, I have provided a material or mixture which is less resistant to the washing away into the glass, but which will wash off into the glass in smaller particles and which will become completely dissolved in the glass, so that no trace thereof is left in the shape of stone, string or ream. The mixture which I preferably use is composed of the ordinary pot clay mixed with a substantial quantity of relatively fine grained pure silica sand. This sand is mixed as uniformly as possible throughout the clay, and serves to promote the solution in the glass of all particles of clay which wash away from the pot. This occurs for two reasons, first the distribution of sand through the body of clays serves to divide or separate the particles of clay so that the washing away thereof occurs in relatively small volumes, and such relatively small volumes are of course more readily soluble in the mass of glass than larger particles of clay would be. In the second place the silica of which the sand is composed reacts with the glass batch more readily than do the particles of clay which have a high alumina content, and the particles of silica at the moment of reaction and solution produce a condition of reaction most favorable to the solution of the clay particles. There are other advantages in the addition of sand; namely (1) changing the index of refraction to render the defects less visible, (2) decreasing the viscosity of the glass formed by the solution of the particle of the pot so that it is more easily mixed into the glass, (3) expansion of the sand tends to counteract the shrinkage of the clay.

I have found that when the sand is used in connection with the clay in the proper proportions substantially all string, stone and ream are eliminated, giving a product of much better marketable quality. It is true that the sand tends to produce what is known as "seed" in the glass, but such seed, unless present in large quantities does not seriously affect the value of the product, and by maintaining the proper proportion and size of grain of sand, the difficulty is largely eliminated. The seed are small gas bubbles in the glass.

My best results have been secured by the use of from 10% to 20% of a sand the bulk of which is of a fineness such that it will pass through a sieve having sixty meshes and be retained by a sieve having a hundred meshes per linear inch (grains about .01 to .005 inch in diameter) such sand being round-grained pure silica sand with a considerable variation in the size of its grains. However, I have found it possible to vary the degree of fineness of the sand, and very much finer and very much coarser grained sand than that specified may be employed. It is also possible to use crushed quartzite rock in place of the sand, the grains being very fine if desired, and not necessarily round grains, the only requirement being that relative fine granulated silica of some kind be employed. The limit of coarseness of sand I believe to be approached when the grains are about .05 inch in size.

As to the range in the percentage of sand which may be employed with beneficial results when compared with the clay without the sand, I regard 8% as about the lowest limit within which the sand could be employed with beneficial results, and 30% about the highest percentage which could be used, the best results being secured when the amount of the sand addition ranges between 10% and 20% of the total mixture thus produced. The quantity of sand which may be properly used also varies with the fineness of sand, the finer the sand, the larger the percentage thereof which may be used. Where too much sand is used there is an undue amount of breakage of the pots due to the expansion in heating them up, and an excessive amount of seed in the glass is produced. The excess of sand, if it be of the finer grains, also tends to weaken the pot by reducing the fusing point of the mixture, so that the pots sag and become distorted during the melting operation. When the amount of sand is reduced to too great an extent the beneficial results as heretofore recited begin to disappear, the string and stone appearing in the glass and the result approaching that secured when the ordinary pot clay is used alone. The quantity of sand desirable and its fineness will also vary with the kind of batch employed, with the melting temperature and with the method of furnace operation.

The use of the sand in the mixture in proper proportion has certain other advantages; one of these is that the presence of the sand tends to decrease the drying shrinkage of the pot, thus preventing loss. A further advantage is that sand reduces the stickiness of the clay, rendering it of better working consistency and easier to form into a pot. The pots formed with the proper amount of sand also have a longer average life in the furnace, due to less cracking, although they wash away faster at each melt. The invention, while primarily designed and described herein for use with pots for the manufacture of plate glass, is of course of advantage in any container or article which contacts with the molten glass whether the article be in the form of a pot, or in some other form such for instance as the draw stones employed in the manufacture of window glass.

What I claim is:—

1. The process of making refractory walls for contact with molten glass which consists in mixing uniformly through ordinary pot clay a quantity of finely divided silica equal to from 8 to 30% of the total mixture and forming such mixture into walls of the desired configuration.

2. The process of making refractory walls for contact with molten glass which consists in mixing uniformly through ordinary pot clay a quantity of finely divided silica equal to from 8 to 30% of the total mixture and forming such mixture into walls of the desired configuration, the silica being of such fineness that the major portion of it will consist of grains less than .05 of an inch in diameter.

3. The process of making receptacles for use in the manufacture of glass which consists in mixing uniformly through ordinary pot clay a quantity of finely divided silica equal to from 8 to 30% of the total mixture, and forming such mixture into receptacles.

4. The process of making receptacles for use in the manufacture of glass which consists in mixing uniformly through ordinary pot clay a quantity of fine grained substantially pure silica sand equal to from 8 to 30% of the total mixture, and forming such mixture into receptacles.

5. The process of making receptacles for use in the manufacture of glass which consists in mixing uniformly through ordinary pot clay a quantity of fine grained substantially pure silica sand equal to from 8 to 30% of the total mixture, and forming such mixture into pots, the sand being of such fineness that the major portion of the grains will be less than .05 inch in diameter.

6. A receptacle for the melting of batch for the manufacture of glass formed by adding to ordinary pot clay and mixing uniformly therethrough from 8 to 30% of finely divided silica.

7. A receptacle for the melting of batch for the manufacture of glass formed by adding to ordinary pot clay and mixing uniformly therethrough from 8 to 30% of substantially pure silica sand of such fineness that the major portion of the grains will be less than .05 inch in diameter.

8. A receptacle for the melting of batch for the manufacture of glass formed by adding to ordinary pot clay and mixing uniformly therethrough from 10 to about 20% of finely divided silica.

In testimony whereof I have hereunto signed my name in the presence of the two subscribing witnesses.

CHARLES H. KERR.

Witnesses:
R. J. MONTGOMERY,
M. W. COZAD.